United States Patent
Bennani

(10) Patent No.: US 8,510,243 B2
(45) Date of Patent: Aug. 13, 2013

(54) METHODS FOR UPDATING AND TRAINING FOR A SELF-ORGANISING CARD

(75) Inventor: Younes Bennani, Paris (FR)

(73) Assignee: Universite Paris 13, Villentaneuse (FR)

( * ) Notice: Subject to any disclaimer, the term of this patent is extended or adjusted under 35 U.S.C. 154(b) by 404 days.

(21) Appl. No.: 12/747,855

(22) PCT Filed: Dec. 12, 2008

(86) PCT No.: PCT/FR2008/052288
§ 371 (c)(1),
(2), (4) Date: Oct. 28, 2010

(87) PCT Pub. No.: WO2009/081005
PCT Pub. Date: Jul. 2, 2009

(65) Prior Publication Data
US 2011/0087628 A1    Apr. 14, 2011

(30) Foreign Application Priority Data
Dec. 12, 2007    (FR) ...................... 07 59765

(51) Int. Cl.
*G06N 5/00* (2006.01)
(52) U.S. Cl.
USPC ............................................. 706/25; 706/45
(58) Field of Classification Search
USPC ...................................................... 706/25, 45
See application file for complete search history.

(56) References Cited

PUBLICATIONS

Duran, et al., Anomaly Detection Through Adaptive Background Class Extraction From Dynamic Hyperspectral Data, Proceedings of the 7th Nordic Signal Processing Symposium (NORSIG 2006), 2006, pp. 234-237.*

Trautmann, et al., Comparison of Dynamic Feature Map Models for Environmental Monitoring, Proceedings of ICNN'95, 1995, pp. 73-78.*

Benabdeslem et al., "Classification et Visualisation des données d'usages d'internet", Actes de l'atelier Fouille du Web des 6émes journées francophones Extraction et Gestion des Connaissances, Jan. 17, 2006, pp. 29-40.

Cabanes et al., "A Local Density-based Simultaneous Two-level Aigorithm for Topographic Clustering", Proceedings of the 2008 IEEE International Joint Conference on Neural Networks, Jun. 1, 2008, pp. 1176-1182.

Cabanes et al., "A Simultaneous Two-Level Clustering Algorithm for Automatic Model Selection", Proceedings of the Sixth International Conference on Machine Learning and Applications, Dec. 13, 2007, pp. 316-321.

Fritzke, "Vektorbasierte Neuronale Netze", Shaker Verlag, 1998, 139 pages.

Mantoro, "Use Location and Mobility for Distributed intelligent Environment", Proceedings of the Fifth International Conference on Ubiquitous Computing, Oct. 12, 2003, pp. 255-256.

(Continued)

*Primary Examiner* — Wilbert L Starks
(74) *Attorney, Agent, or Firm* — Thompson Coburn LLP

(57) ABSTRACT

The updating method comprises selecting the best winning neuron and second best winning neuron, modifying the prototype vectors of the best winning neuron and the neurons located around the best winning neuron in the direction of the vector of the learning point (x(k)), determining the neighboring neurons (N(u*)) of the best winning neuron (u*) and, if the second best winning neuron (u**) is part of the neighboring neurons (N(u*)), increasing the valuation of the connection between the first and second best winning neurons.

Figure 1:
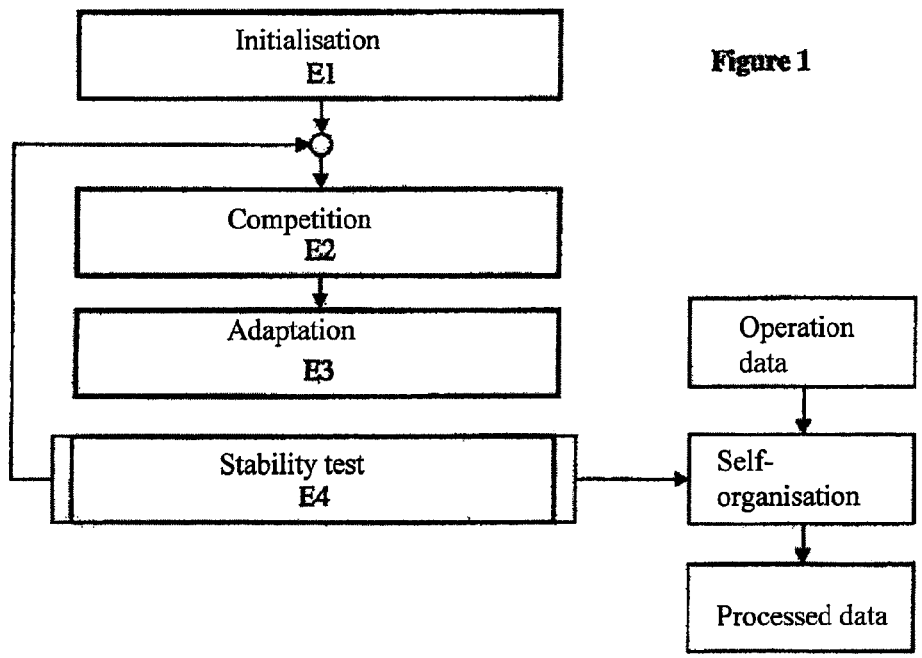

The updating method further involves reducing the valuation of each connection between the first best winning neuron and the direct neighboring neurons (N(u*)) other than the second best winning neuron (u**).

17 Claims, 8 Drawing Sheets

(56) References Cited

PUBLICATIONS

Muhammed, "Unsupervised Fuzzy Clustering Using Weighted Incremental Neural Networks", International Journal of Neural Systems, Dec. 2004, pp. 355-371, vol. 14, No. 6.

Tasdemir et al., "A New Cluster Validity index for Prototype Based Clustering Algorithms Based on Inter- and Intra-Cluster Density", Proceedings of the 2007 International Joint Conference on Neural Networks, Aug. 12, 2007, pp. 2205-2211.

Ward et al., "Hierarchical Grouping to Optimize an Objective Function", Journal of the American Statistical Association, Mar. 1963, pp. 236-244, vol. 58, Issue 301.

Yamakawa et al., "Evaluation-Based Topology Representing Network for Accurate Learning of Self-Organizing Relationship Network", Lecture Notes in Computer Science, Oct. 3, 2006, pp. 968-977, vol. 4232.

\* cited by examiner

Figure 9
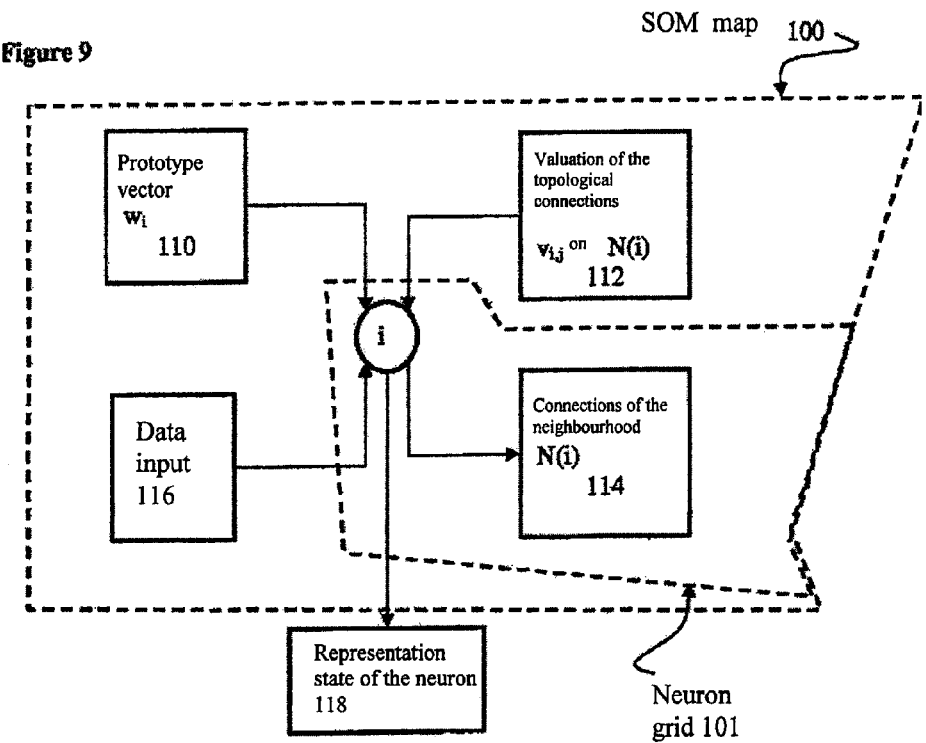
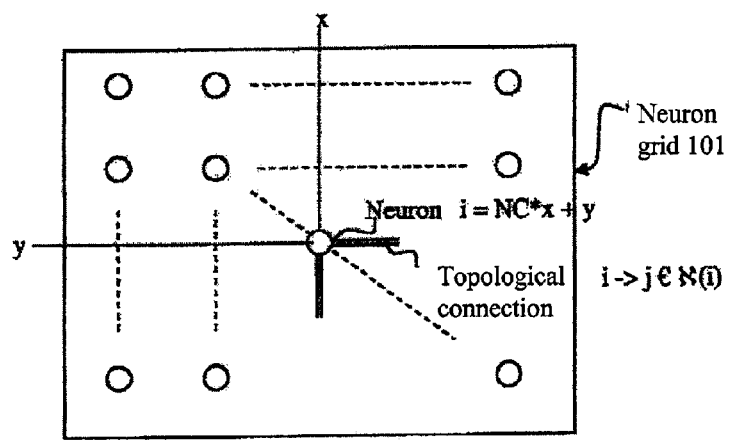
Figure 10

METHODS FOR UPDATING AND TRAINING FOR A SELF-ORGANISING CARD

The present invention relates to self-organising maps having valued topological connections. It also relates to a method for controlling an automatic learning system which uses such a self-organising map. Finally, it relates to an analyser of dynamic behaviours of individuals which cooperates with traceability sensors such as RFID labels or navigation markers on a remote data-processing network. More specifically, the control method and the implementation system thereof are intended to produce a mapping in at least two dimensions which represents the geographical evolution and, where applicable, the time evolution of movable elements monitored by the self-organising map of the system.

In the prior art, there are known artificial neuron systems which are connected in accordance with two-dimensional grids or maps and which function after learning to recognise shapes or classify characters in a data group. In particular, reference can be made to documents published in the name of KOHONEN entitled "*Self-organising maps*", Springer, Berlin 2001 or to the patents.

In this prior art, a self-organising map is composed of a group of artificial neurons, each neuron being constructed based on a calculation unit which comprises inputs and at least one output which is activated in accordance with the data submitted and the inputs thereof. The output of the neuron is connected to at least two other neighbouring neurons, so that the output state of the neuron influences the processing behaviour of the neurons to which it is connected.

A self-organising map must follow a learning step which allows the output of the neurons of the map to be programmed in accordance with the type of problem which it is desirable to resolve for a category of data. In this manner, for a set of data submitted subsequently at the input, only the neurons of some zones of the self-organising map are activated so that the data submitted during operation after learning show their organisation. For example, if it is desirable to identify in an image the presence of a red disc, the self-organising map must first be programmed during its learning phase so that only a neuron assigned to this end is activated. To this end, there is presented as a learning set a series of images which contain only red discs and the control parameters of the neurons of the self-organising map are adjusted so that the neuron which is intended to indicate the presence of a red disc is active. When, during operation of the self-organising map, any image is submitted at the inputs thereof, only the images containing at least one red disc activate the neuron for detecting the presence of a red disc.

Generally, self-organising maps (SOM) constitute tools for automatic classification of data and particularly large sets of data in accordance with one or more criteria. When a set of input data is submitted at the input of a SOM, the learning of the map will have been carried out beforehand so that, when the set of input data contains at least one class of data corresponding to a classification criterion of data provided, a group of interconnected neurons of the SOM is activated so that a section representing the activation state of the neurons of the SOM will indicate to the user thereof an illustration in which the zone of the map corresponding to the presence of data corresponding to the classification criterion provided will be in a first colour whilst the other zones representing the activation state of the neurons of the map will be in another colour. Of course, several zones may be activated in accordance with one or more classification criteria.

In this prior art, in particular in the case of input data which correspond to geographical locations or to movements detected in a determined space, the representation of such a classification is not satisfactory, in particular since the classification applied by such a SOM is not effective.

The invention overcomes this disadvantage of the prior art. It relates to a self-organising map which comprises a network of artificial neurons which are interconnected in accordance with a predetermined interconnection diagram with synaptic weights or prototype vector determined by learning in known manner. According to the main feature of the invention, the self-organising map further comprises a resource for determining and using a valuation of at least one interconnection link between at least two neurons.

In the prior art, there are known systems composed of a plurality of movable or actuating elements whose actions are a priori not determined in advance and for which knowledge of the movements in a specific geographical environment has considerable importance. This is, for example, the case when it is desirable to follow the addresses visited by users of a communications network such as an Internet network, or when it is desirable to know the physical movements of the mobile phones of a mobile telephone network or more generally the physical movements of individual and movable elements which are provided with markers which allow them to be located precisely, such as radio-frequency labels of the RFID type. The problem addressed by the invention involves the large quantity of location data produced by such systems and by the redundancy of some of these data. Consequently, it is very difficult to trace the paths followed by each of the individuals or individual elements followed on the basis of the known techniques. The method of the invention relates to non-supervised learning of typologies or categories represented in data which describe the dynamic behaviour of individuals in a determined population. Non-supervised learning refers to learning of a device, such as a network of artificial neurons or a Self-Organisation Map SOM, based on a group of non-labelled sets of input data (without knowledge a priori). Each set of input data represents a characteristic or a type which is intended to constitute or to write or define a typology or categories which are represented in the data describing the dynamic behaviour studied. The method of the invention allows a characteristic space to be discovered for a set of spatial and temporal data. Such a space preserves the notion of proximity between the examples which describe the process to be modelled.

According to another aspect of the invention, the spatial and temporal data are classified taking into account both the positions and the developments (or trajectories) of the individuals of a determined population. The method of the invention allows non-supervised automatic classification to be determined based on a compromise between the positions and the developments. In particular, the classification provided by the control method of the invention allows the influences of the two types of data to be balanced.

According to another aspect of the invention, the control method allows the number of trajectories observed to be reduced, in the form of prototype trajectories, which are initially described in a group of sets of input data and which are submitted as learning data at the input of a network of neurons as a self-organising map in a system which uses the method of the invention.

According to another aspect of the invention, it is possible based on the control method to visualise the trajectories in the form of a series of developments of individuals of a determined population in the topological space or mapping in which they develop. In particular, the number of groups, typologies or categories is determined automatically by the control method carried out during the learning step of the neuron network used, for example, a self-organising map in a system for implementing the control method of the invention. In the prior art, there are known solutions which allow groups of sets of data to be calculated without a priori having knowledge of the subject of the hidden structure of these data.

The classification of such data groups can be defined as the division of a set of elements described by a plurality of data into a collection of mutually separate sub-groups.

For example, there are used hierarchical methods and methods for data partition. It is, for example, known to use a hierarchical grouping technique by separating shapes in one hierarchy in the form of trees or dendrograms constructed from the shapes to be collated. An example of such prior art can be found in the document WARD Joe H, "Hierarchical Grouping to Optimize an Objective Function", Journal of the American Statistical Association, 58 (301): 236-244, 1963.

An effective grouping method is the method referred to as self-organising maps or Kohonen maps. Such prior art is described in particular in the documents KOHONEN Teuvo, <<Self-organizing Maps>>, Springer Berlin, 1st edition 1984 and KOHONEN Teuvo, <<Self-organizing maps>>, Springer, Berlin, 3rd edition 2001.

A self-organising map is constituted by a two-dimensional or artificial neuron network for mapping input data presented in the form of an input vector which has a large number of dimensions as a group of output data which are represented in a space which is generally two-dimensional using a competitive and non-supervised learning method.

The present invention overcomes the faults of the prior art by providing a control method which allows automatic and simultaneous segmentation of the topological map. The discovery of groups, typologies or categories or classes is carried out automatically at the same time as the estimation of the prototypes. Such a learning method allows a mapping to be established which is representative of both the temporal and spatial developments of the individuals based on a set of determined observations.

It relates to a method for controlling a neuron network in the form of a self-organising map in order to process at least one group of data relating to individual elements which develop over time and/or a geometric space. The method consists in:
  a first step for initialising the self-organising map in order to solve a determined problem for classification of input data in the form of a large vector;
  a second step of competition between neurons of the self-organising map based on at least one set of input data; and
  a third step for adapting the neuron network based on at least one set of input data in order to produce a set of output data which are representative of a map development.

According to one aspect of the invention, the first initialisation step comprises the steps of:
  determining the topology of the self-organising map;
  initialising all of the synaptic weights (prototypes) of the self-organising map;
  initialising at a determined value each topological connection (connection between neurons) in the self-organising map;
  initialising at a determined value the density associated with each neuron of the self-organising map.

According to another aspect of the invention, the step for initialising all of the synaptic weights of the self-organising map comprises a step for placing all of the synaptic weights at a random value in a predetermined range of initialisation values of the synaptic weights.

According to another aspect of the invention, the step for initialising each topological connection at a determined value consists in placing all of the connections at an initial value of zero.

According to another aspect of the invention, the step for initialising each density associated with each neuron at a determined value consists in placing all of the densities at an initial value of zero.

According to one aspect of the invention, the second step for carrying out learning of the self-organising map consists in:
  a step for submitting at least one input example (randomly selected from the examples available) at the input of the self-organising map;
  a step for detecting the first prototype vector of the self-organising map closest to the input example submitted at the input of the self-organising map; and
  a step for selecting a second prototype vector of the self-organising map, which is different from the first, closest to the input example submitted at the input of the self-organising map.

According to an aspect of the invention, the third step for adapting the parameters of the self-organising map consists in:
  a step for updating the prototypes;
  a step for updating the topological connections; and
  a step for updating the densities associated with each neuron of the self-organising map.

According to one aspect of the invention, the step for updating the prototypes consists in implementing a rule for adapting the shape:

$$w^{(i)}(t) = w^{(i)}(t-1) - \epsilon(t) \times K_{i,u^*}(x^{(k)}) \times (w^{(i)}(t-1) - x^{(k)})$$

where:
  $w^{(i)}(t)$ and $w^{(i)}(t-1)$ are the prototype vectors of the prior status $t-1$ of the self-organising map and of the updating status $t$;
  $x^{(k)}$ is the k-th learning example during the learning step $t$;
  $u^*(x^{(k)})$ represents the neuron having the synaptic weight vector closest to the learning example $x^{(k)}$;
  $\epsilon(t)$ is a function for controlling the convergence of the learning algorithm at the time $t$; and
  $K_{i,u^*}(x^{(k)})$ is a core neighbourhood function for carrying out regularisation and weighting of distances between neurons.

According to another aspect of the invention, the core neighbourhood function is defined by a relationship of the form:

$$K_{i,j} = \frac{1}{\lambda(t)} \times e^{-\frac{d_1^2(i,j)}{\lambda^2(t)}}$$

where:
  the parameter $\lambda$ (lambda) is determined in order to carry out a regularisation and $d_1$ (i,j) is the distance between the neuron i and the neuron j on the map.

According to another aspect of the invention, the updating of the topological connections starting from the first best winning neuron $u^*$ follows the following adaptation rules:

$$v_{u^*,u^{**}}(t) = v_{u^*,u^{**}}(t-1) + r(t) \times |\aleph(u^*)|;$$

$$v_{u^*,i}(t) = v_{u^*,i}(t-1) - r(t) \times |\aleph(u^*)|; \ \forall i \in \aleph(u^*), i \neq u^{**}$$

where:
  $u^*$ is the first best winning neuron (closest to $x^{(k)}$:

$$u^*(x^{(k)}) = \underset{1 \leq i \leq M}{\mathrm{Argmin}} \|x^{(k)} - w^{(i)}\|^2$$

u** is the second best winning neuron (the second closest to $x^{(k)}$:

$$u^{**}(x^{(k)}) = \operatorname*{Argmin}_{1 \leq i \leq M, i \neq u^*} \|x^{(k)} - w^{(i)}\|^2$$

$\aleph(u^*)$ is the group of neighbouring neurons of $u^*$ and $|\aleph(u^*)|$ is the number of neighbours;
the function $r(t)$ being defined by:

$$r(t) = \frac{1}{1 + e^{\left(-\frac{\alpha t}{t_{max}} + \beta\right)}}$$

the parameters $\alpha$ (alpha) and $\beta$ (beta) being determined so as to carry out a regularisation of the adaptation of the topological connections.

According to another aspect of the invention, the updating of the local density $D^{(i)}$ associated with each neuron i of the map follows the following adaptation rule:

$$D^{(i)}(t) = D^{(i)}(t-1) + r(t) \times e^{-\frac{\|x^{(k)} - w^{(i)}(t)\|^2}{2\lambda^2(t)}}$$

the parameter $\lambda$ (lambda) being determined so as to carry out a regularisation of the densities.

According to another aspect of the invention, at the end of learning, the neurons which are connected via positive topological connections define the groups or the typologies or the classes. The segmentation (cutting of the topological map) is consequently carried out automatically during the learning and without supervision.

According to another aspect of the invention, it further comprises a step for refining the segmentation carried out based on the detection of the local maxima of local densities.

According to another aspect of the invention, the control method further comprises a step for determining a new segmentation (finer) on the basis of an aggregation of the neurons around density peaks by following a density gradient which ascends along the topological connections which connect two neurons of the same group.

According to another aspect of the invention, the control method further comprises a step for reducing noise by aggregation of sub-groups of neurons of the self-organising map belonging to the same category of densities greater than a determined threshold.

The invention also relates to a system for implementing the control method of the invention or dynamic behaviour analyser comprising:
a self-organising map;
at least one set of input data groups;
at least one memory for relevance values of the topological connection between a best winning unit of the self-organising map and at least one other unit of the map;
a member for displaying the activated units of the self-organising map; and
a member for presenting a group of data representative of the behaviour of a determined population in a mapping;
so that, after a learning step, the member for displaying the activated units of the self-organising map is a representation of the mapping and/or the tracking of the individuals of the determined population.

Figure 5:
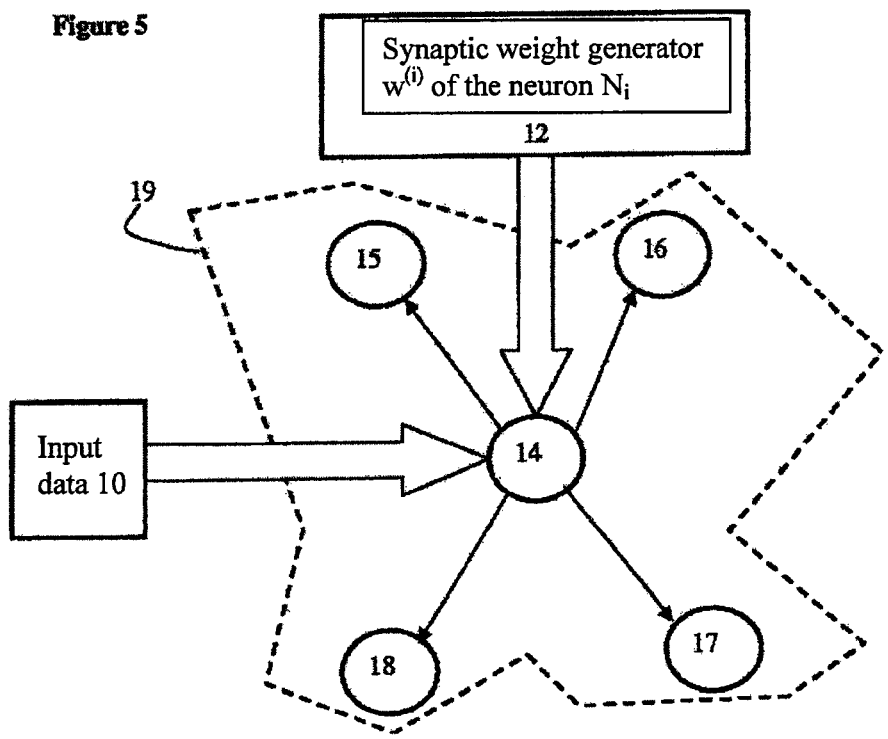
Figure 6:
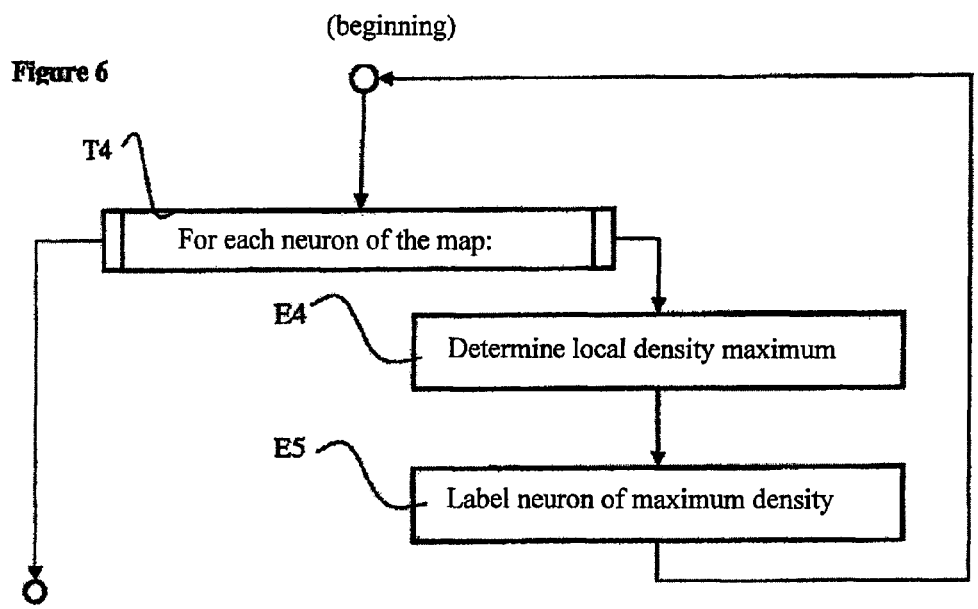
Figure 7:
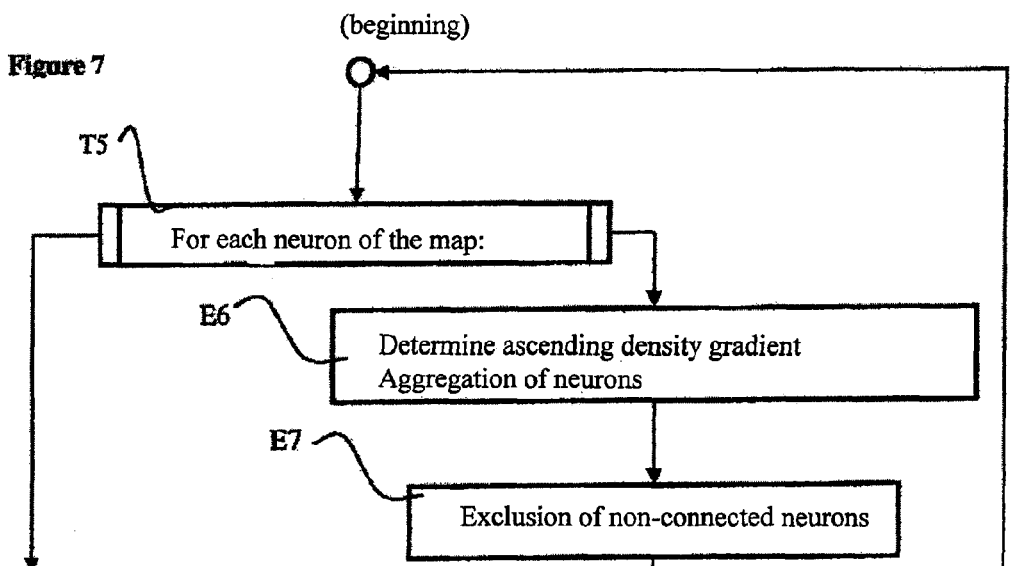
Figure 8:
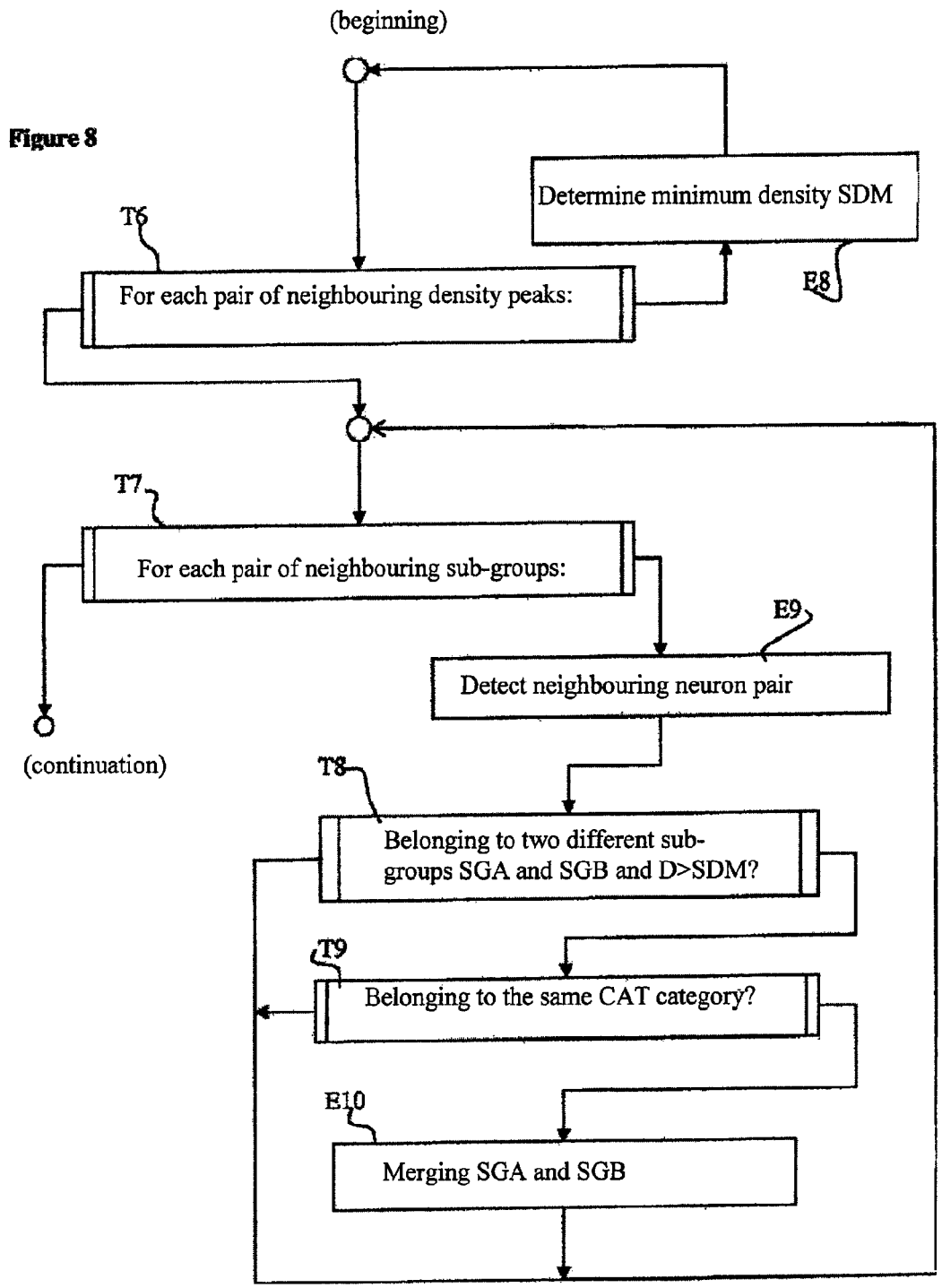
Figure 11:
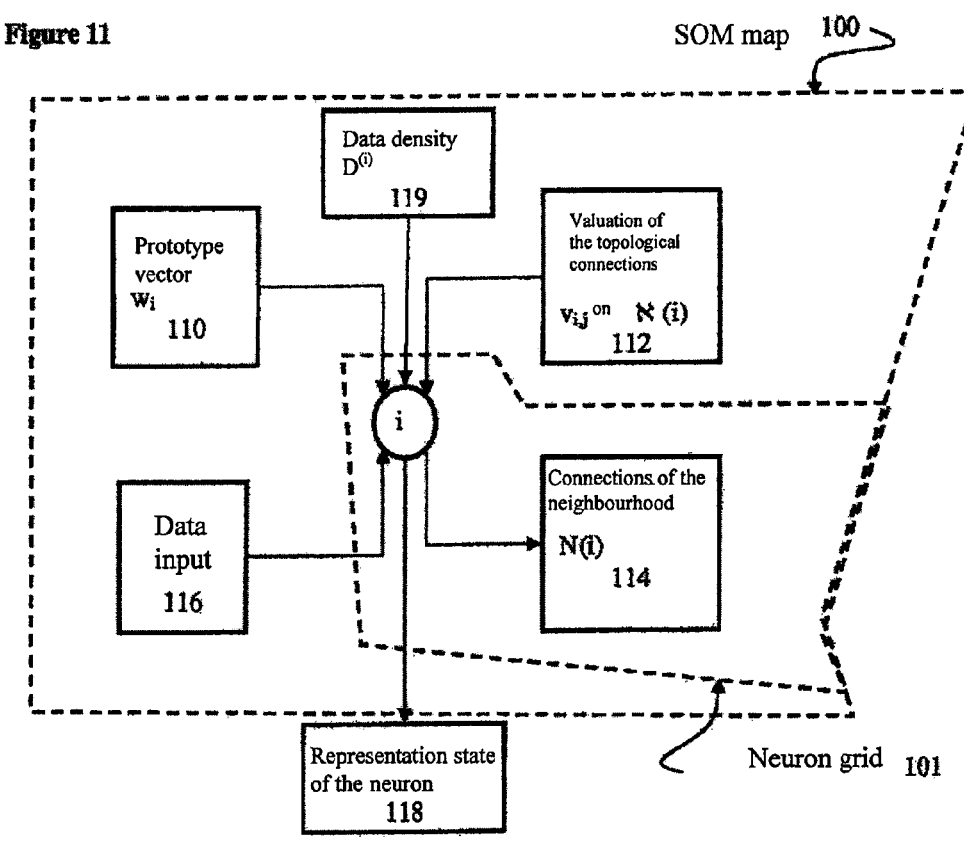
Figure 12:
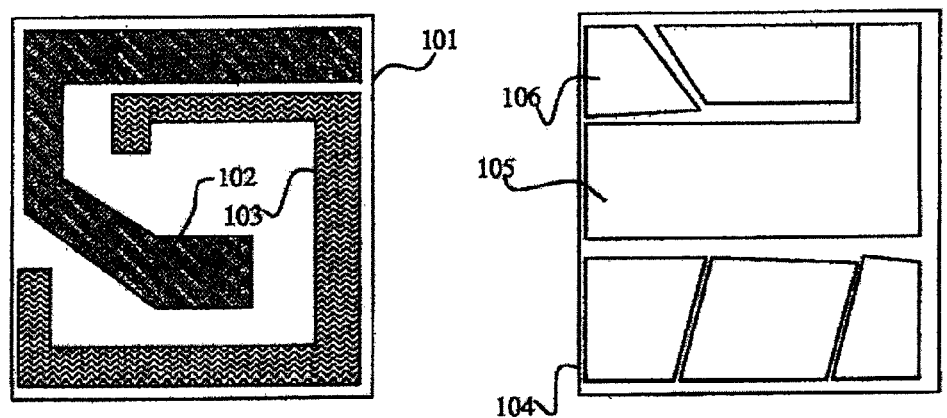
Figure 13:
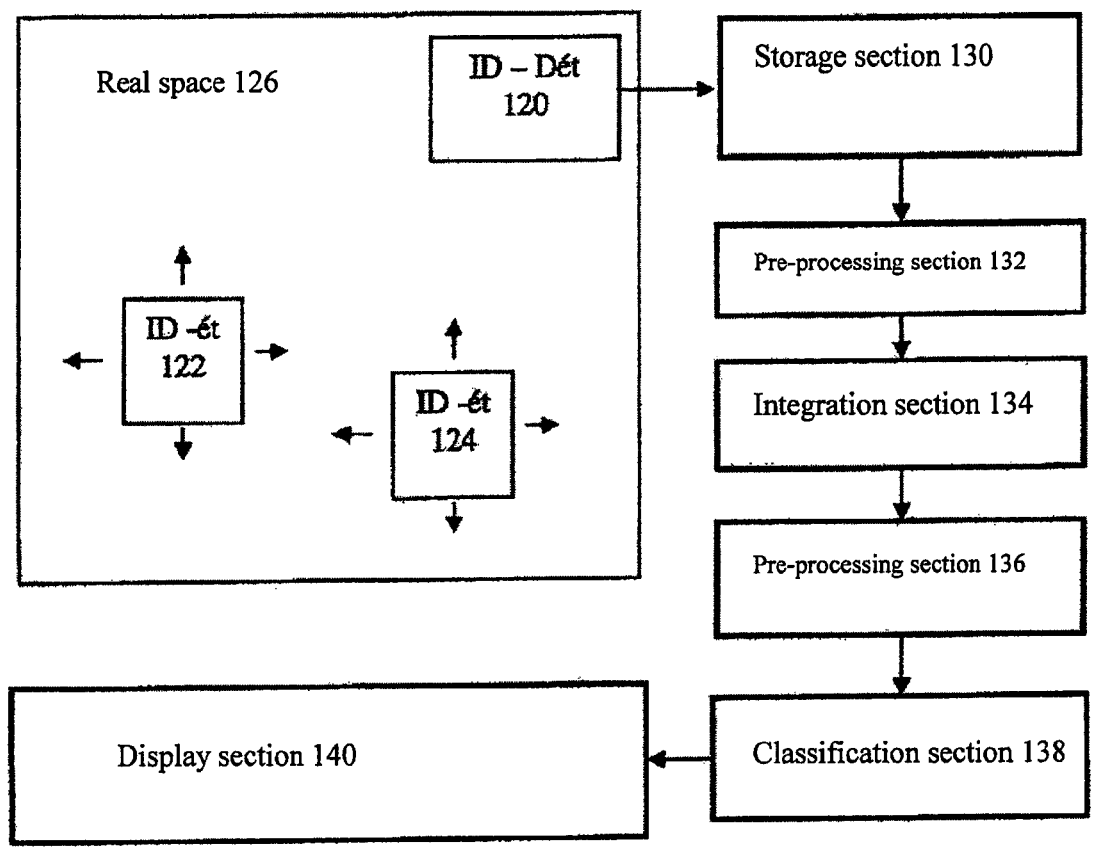
Figure 14:
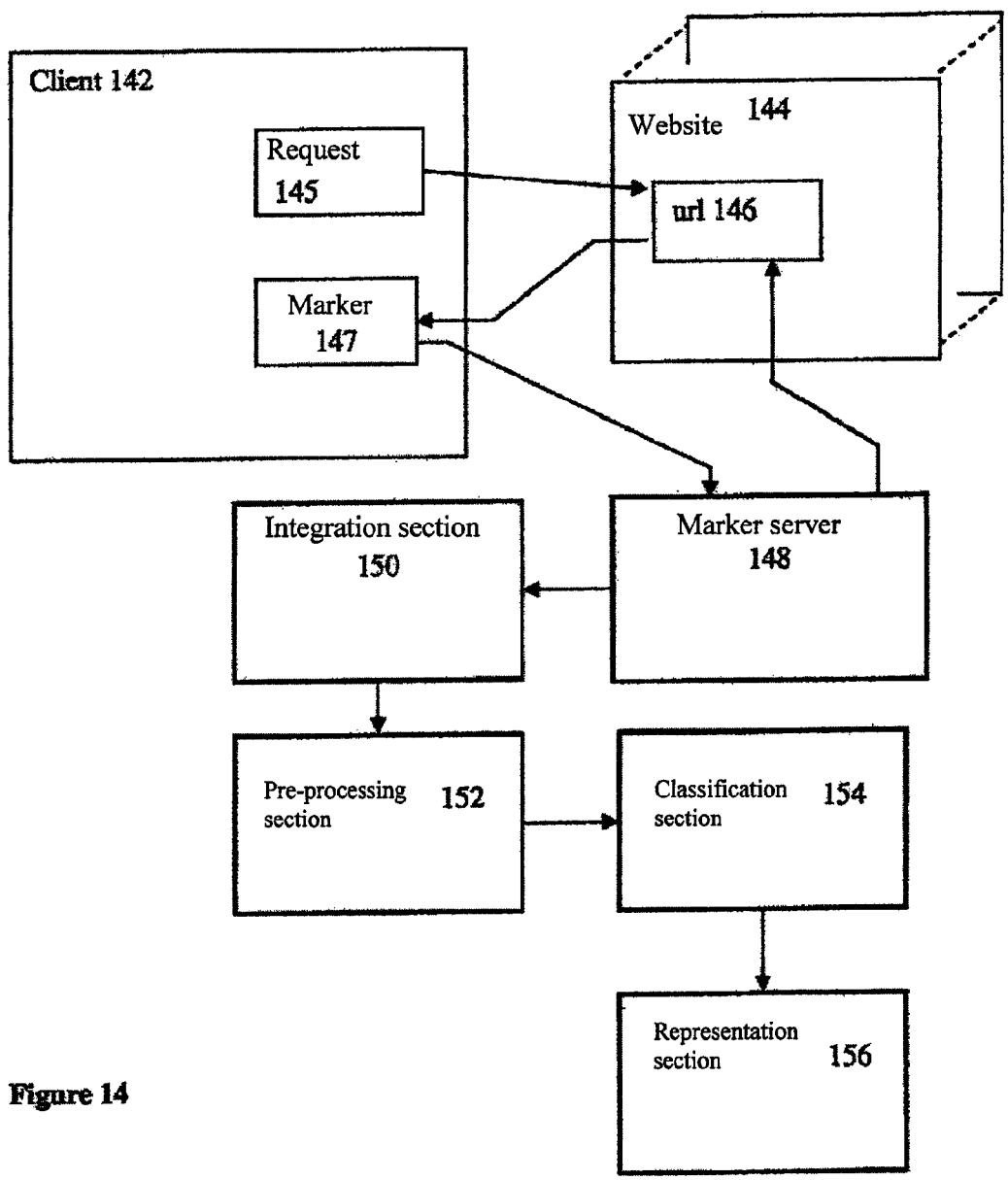

Other features and advantages of the present invention will be better understood from the description and the appended Figures, in which:
FIGS. 1 to 4 are flow charts of the learning step of the method of the invention;
FIG. 5 is a portion of a self-organising map used in the method of the invention;
FIG. 6 is a flow chart of an additional step for refining the segmentation;
FIG. 7 is a flow chart of a step for determining an additional segmentation;
FIG. 8 is a flow chart of a step for filtering the reduction noise into categories, typologies or classes;
FIG. 9 illustrates an embodiment of a self-organising map according to a first embodiment of the invention;
FIG. 10 illustrates a detail of organisation of the self-organising map of the embodiment of FIG. 9;
FIG. 11 is a self-organising map according to a second embodiment of the invention;
FIG. 12 is a visualisation of the result of the classification carried out with the self-organising map and the control method of the invention compared with the result of a classification carried out on the given input modes using a self-organising map of the prior art;
FIG. 13 illustrates an embodiment of an application of the self-organising map and its control method for displaying position data and/or displaying trajectory data of at least one mobile which is provided with an RFID label; and
FIG. 14 illustrates an embodiment of an application of the self-organising map and its control method for displaying consultation data and/or displaying navigation data of at least one WEB client provided with tracers.

There are a number of methods which allow input data to be grouped into homogeneous groups of data with respect to a determined classification criterion. However, the known solutions which have been set out above do not allow automatic partitioning (without fixing a priori the number of groups) of data into homogeneous groups to be carried out when the data are too large. In order to produce maps for grouping data in accordance with the SOM theory, it is known to use methods which allow the number of examples of the group of input data to be reduced based on the density and the distance between points which are representative of these data. In the technique for grouping data in two levels based on self-organising maps SOM, the reduction of the dimensions and rapid learning is combined in a first level in order to construct a sector space of reduced dimensions (composed only of prototypes). Then, another method for grouping data is applied in this new space in order to produce a final set of groups of data in the second level. Although the methods for grouping in two levels are more advantageous than the methods for reducing the sizes by increasing the processing time, and even though they allow a visual interpretation of the processing results, the segmentation of data obtained by the SOM is not optimal since part of the information is lost during the first step of reducing the size (reduction of the number of examples). Furthermore, the separation into two steps is not suitable for a dynamic segmentation and data which evolve over time.

In the prior art, when a self-organising map of the Kohonen type is used, an output cell is activated and when an observation is recognised in a competition layer, the other cells are deactivated and the single activated output cell is reinforced. As is known in the technology of self-organising maps, each cell is occupied by an artificial neuron which is associated with a determined group of input values and with a determined group of multiplication parameters. Furthermore, a neighbourhood of each output cell or neuron is determined so that the activation of a neuron can influence the multiplication parameters and/or the activation state of the cells or neurons of the neighbourhood belonging to the neurons at which the neighbourhood is entered. If it is determined that the neurons of the neighbourhood of the activated neuron have been deactivated, a "Winner Takes All" rule is used. In practice, in a determined zone of the self-organising map, the neurons are specialised in the recognition of a specific category for input data observation so that the entry data corresponding to a specific criterion of classification grouping have a tendency to activate a specific zone of the self-organising map which applies a "Winner Takes All" rule.

A self-organising map SOM consists of a two-dimensional layer of artificial neurons which are each connected to n input data via n connection weights, and to their adjacent neurons by topological connections.

This has been illustrated in FIG. 5 in which there is illustrated a portion 19 of a self-organising map containing a random neuron 14 connected via appropriate connections to a plurality of neurons which constitute the neighbourhood of the random neuron 14, for example, four neurons 15-18. Each neuron of the self-organising map is connected via appropriate connections to a group of input data 10 and a synaptic weight generator 12. In known manner, the output terminal s of the random neuron generates an output signal which is established in accordance with the input data $e_i$, submitted by the input data group 10 and the synaptic weights $w_i$ submitted by the synaptic weight generator 12.

In known manner, the learning step of a self-organising map consists in determining a group of random synaptic weights at the neurons of the self-organising map and a set of P groups of input data, each group of input data having a determined character or classification. In this manner, the set of input data $E_p$ is constructed so as to contain only the input data which have the classification character $C_p$. It is desirable to determine the synaptic weights of the neurons of the self-organising map so that a determined region $R_p$ of the map sees its neurons or cells activated.

After the learning step, when the self-organising map receives a random group of data E, if this group of input data has the character $C_{p1}$ of classification and the character $C_{p2}$, only the two corresponding regions $R_{p1}$ and $P_{p2}$ of the self-organising map are active and the detection of these two active regions ensures the recognition of the characters $C_{p1}$ and $C_{p2}$ in the group of input data E present at the input of the self-organising map.

As set out in the preamble of the present description, the neurons of the self-organising maps of the prior art mentioned in this instance do not allow the topological distances between the neurons of the map to be taken directly into account during its self-organisation. Consequently, the self-organising map of the prior art in particular "becomes deformed" in a manner which is not directly linked to the topology thereof when it adapts to the data which are submitted to it at the input. The invention in a first embodiment provides a means for solving this problem. FIG. 9 illustrates such an embodiment. The self-organising map 100 comprises a grid of artificial neurons 101, only the neuron "i" being illustrated. In known manner, the neuron "i" co-operates with a resource 110 of the SOM 100 in which there are retained and updated, in particular during learning, the prototype vectors $w^{(i)}$ which correspond to the synaptic weights of the operator MAC (not illustrated) of the neuron "i". It also co-operates with a data input resource 116, on which there are set out the test sets which thus allow, as will be described during the description of the learning step of the control method of the invention, the prototype vector and other parameters to be modified in order to ensure the programmed response of the neuron "i" to a data type which complies with a determined classification criterion. The neuron "i" as is known then co-operates with a resource 114 which controls the topological connection of the neuron "i" with the neurons of a neighbourhood N(i) of the neuron "i". Such a neighbourhood, also referred to as $\aleph$ below, is determined based on a function of distance between neurons selected during the design of the map. Such a distance function in particular allows, when a set of input data is submitted to the self-organising map, it to be determined that two neurons are more or less close to each other relative to other neurons. In this manner, the neighbourhood of a specific neuron will be constituted by all of the other neurons which are located at a distance from this specific neuron which is less than a determined neighbourhood threshold.

The self-organising map of the first embodiment further comprises a resource 112 which retains and updates, in particular during learning, valuations $v_{ij}$ of the topological connections between the neuron "i" and any neuron "j" belonging to the neighbourhood N(i) determined by the connection resource 114. As will be better understood below from the description of the learning step of the control method of the invention, the valuation $v_{ij}$ allows a relevance to be determined for the connection between the neuron "i" and the neuron "j" of its neighbourhood. This parameter allows the deformation of the grid 101 of the neurons of the map 100 to be "forced" when it is desirable for it to be self-organised on a set of input data 116. According to a feature of the invention, the valuation $v_{ij}$ of the topological connection between the neuron "i" and the neuron "j" is higher, the closer the two neurons are to each other in the context of the distance function selected.

FIG. 10 illustrates a detail of the neuron grid 101 of FIG. 98 in which the neurons are distributed in a square grid, the neuron "i" at the intersection of the column x and the line y being connected by a topological connection i towards the neuron j of the neighbourhood N(i) of the neuron "i". Another non-referenced vertical connection has been illustrated. Of course, the arrangement of the neurons may take any grid having a plurality of levels, in volume, in accordance with triangular, rectangular or polygonal mesh. Furthermore, the neuron "i" can also be connected to its closest neighbours, to some of them or others further away, depending on what has been programmed in the connection resource 114 (FIG. 9) of the neighbourhood N(i).

FIG. 11 illustrates a second embodiment of a self-organising map according to the invention. In FIG. 11, the same elements as those of FIG. 9 or 10 have the same reference numerals and will not be described further. The self-organising map of the second embodiment repeats all the resources of the map of the first embodiment. There is added a resource 119 which maintains and updates, particularly during learning, data coefficients referred to as having local density $D^{(i)}$, each associated with the current neuron (i), which allow the number of data of the input data set 116 to be counted which are related most closely to the neuron "i". Such an item of data in particular allows the noise to be reduced from the association of a neuron with data which belong to a class which is very close to the data which are most suitable therefor.

The learning step of the control method of a self-organising map according to the invention will now be described. The training or learning data group is used to organise the self-organising maps by topological constraints which are located in the space of the input data. In this manner, an association or topological constraint in the input space which is close to a first topological constraint which activates a first unit of the self-organising map will activate a second unit of the self-organising map close to the first activated unit. It is thus possible, for example, to represent the geographical relationship of topological constraints of the input space with activated units in localised regions of the self-organising map, which allows the geographical position of a topological constraint in the input space to be displayed directly on the activation state of the units of the self-organising map.

Each winning neuron updates its reference (prototype) vector of synaptic weights which makes it more sensitive for any subsequent illustration of this type of input data.

In order to achieve a topological mapping of the characteristics of geographical classification contained in input data, the neurons of the neighbourhood of the winning neuron update their own reference vector in accordance with their distances with respect to the winning neuron, in accordance with a neighbouring function which is determined as a neighbouring function calculated in accordance with a symmetrical radial Gaussian.

According to the invention, there is associated with each topological neighbouring connection between a winning neuron and a neuron in the neighbourhood thereof, a topological valuation or value which is indicative of the relevance of the connected neuron for the type of classification for which the self-organising map is provided. This topological neighbouring connection will be promoted by an increase of the value thereof indicating the relevance of the connection whilst all the other topological neighbouring connections of the neighbourhood of the alliance neuron will be inhibited by a reduction in the value indicating the relevance of the connection of each of the other neurons which belong to the neighbourhood of the winning neuron.

According to another aspect of the invention, there is associated with each neuron of the self-organising map a second additional parameter, referred to as the density of the neuron, in which there is recorded the number of input data which are associated with the neuron.

At the end of the learning step, a region of interconnected cells will thus constitute an artificial image of the sub-group of the input data which has the determined classification character associated with this region on the one hand and, if this classification character is related to a geographical characteristic contained in the input data, the artificial image of the sub-group constituted by the region of interconnected cells will constitute a replica of the geography which constitutes the input data, on the other hand.

According to the invention, the learning step of the control method consists in:
- increasing the density associated with each neuron of the two neurons which are most sensitive to a determined character in the input data, the neurons being illustrated by the prototype vectors closest to the group of input data presented at the input of the self-organising map;
- increasing the value of the connection between the two neurons which are most sensitive to the group of input data presented at the input of the self-organising map;
- updating the prototype vectors, that is to say, adapting them.

This learning step is repeated until the prototypes are stabilised.

There will now be described a step which allows the neighbourhood of a winning neuron to be determined. A connectionist learning method is used based on minimising a cost function. In a specific embodiment, a step for calculating a gradient is used, the cost function being defined by:

$$\tilde{C}(w) = \frac{1}{N}\sum_{k=1}^{N}\sum_{j=1}^{M} K_{j,u^*(x^{(k)})} \times \|w^{(j)} - x^{(k)}\|^2$$

where N represents the number of learning input data samples, M the number of neurons in the self-organising map, $u^*(x^{(k)})$ represents the neuron having the synaptic weight vector which is closest to the learning example $x^{(k)}$ and $K_{ij}$ is a core function which can be determined in a specific embodiment, by a relationship of the form:

$$K_{i,j} = \frac{1}{\lambda(t)} \times e^{-\frac{d_1^2(i,j)}{\lambda^2(t)}}$$

where the function $\lambda(t)$ is a temperature function which models the extent of the topological neighbourhood which is defined, in a specific embodiment, by a relationship of the form:

$$\lambda(t) = \lambda_i \left(\frac{\lambda_f}{\lambda_i}\right)^{\frac{t}{t_{max}}}$$

in which $\lambda_i$ and $\lambda_f$ represent the initial and final temperatures, $t_{max}$ is the maximum number allocated during the time, that is to say, the number of repetitions for the learning sample x. $d_I(i,j)$ is a distance defined between the two neurons i and j in the self-organising map with the respective co-ordinates: (k, m) for the neuron i and (r, s) for the neuron j. In a specific embodiment of the method of the invention, a distance relationship is used of the form referred to as the "Manhattan distance":

$$d_I(i,j) = |r-k|+|s-m|.$$

According to the method of the invention, each topological connection is associated with a real relevance value v of the pair constituted by a neighbouring neuron connected to the winning neuron. The value of this connection v is adapted during the learning step. In a specific embodiment, each neuron being considered as a node of a topological graph, a specific edge of the topological graph belongs to a Delaunay triangulation which corresponds to the group or set of learning input data.

The method of the invention therefore comprises a learning step which itself has three component steps, that is to say:
- a step for initialising the self-organising map SOM;
- a competition step which is intended to determine winning neurons for a determined group of topological constraints on an input data space; and
- an adaptation step which is intended to find an optimum value for the topological valuations between the winning neurons and their closest neighbours.

Preferably, following the learning step there is carried out a stability test for the values determined during the adaptation step and/or competition step so that if the determined values remain stable, the learning step is terminated and, if not, the control is passed to the adaptation step.

FIG. 1 is a flow chart of the learning step of the method of the invention at the left-hand side of the Figure and a block diagram of a system which implements the method of the invention after the self-organising map has been adapted to the problem for which the system is designed. After a step E1 for initialising the SOM, a loop is entered which comprises a competition step E2, then an adaptation step E3 and finally a test E4 for stability. When the test E4 is positive, a signal for activating the self-organising map SOM is generated so that a group of operating data can be submitted at the input of the self-organising map and a group of output data is available following this operating step, which follows the adaptation step described with reference to FIG. 1.

In particular when the output of the winning neurons of the self-organising map is activated, there is directly provided a two-dimensional illustration of the geographical categories contained in the data of the input group. Two applications of this type will be illustrated below.

The component steps of the learning step of the method of the invention will now be set out in detail below.

Figure 2:
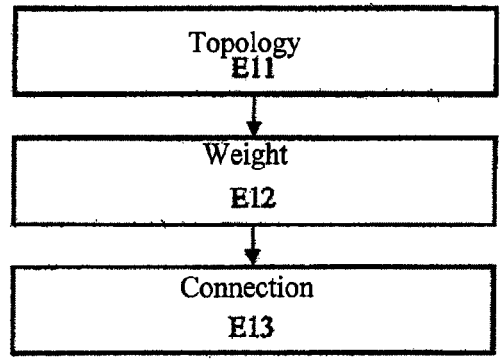

FIG. 2 is a flow chart of the steps forming the initialisation step E1. During step E11, the definition of the topology of the self-organising map SOM is carried out. This step allows the neighbourhoods of the neurons to be adapted in order to adapt the neighbourhood connections to the type of classification problem intended.

During a step E12, the M synaptic weight vectors $w^{(i)}$ of the M neurons i are initialised. Preferably, the initial values of the synaptic weights are random in a determined range.

During a step E13, the neighbourhood connections are initialised by determining real relevance values v of the pair constituted by the first winning neuron and a neighbouring neuron at a determined value. Preferably, such an initial value is zero.

Figure 3:
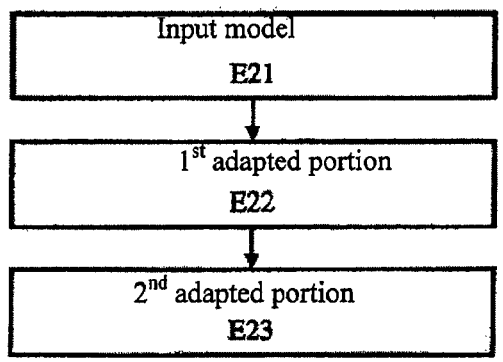

FIG. 3 is a flow chart of the component steps of the competition step E2. During step 21, there is prepared a group of input or model data $x^{(k)}$(k=1 ... N) which is intended to activate a specific zone of the self-organising map. Such a specific zone contains a determined number of winning neurons which are arranged in accordance with a determined topological arrangement.

In particular, such a topological arrangement reproduces the geographical distribution of the learning data $x^{(k)}$. In a specific embodiment, the specific activated zone contains only one neuron. For input data which comply with a criterion of geographical classification, a single neuron corresponds to the presence of a geographical entity in a determined position in a geographical map, this position being illustrated in the learning data $x^{(k)}$.

During a step E22, a first best winning unit u* is selected, preferably the unit comprising a single neuron. In a specific embodiment, the vector $w^{(i)}$ of the synaptic weights of a neuron i is compared with the input data $x^{(k)}$ using a determined distance, such as a Euclidian distance so that the winning neuron for the input $x^{(k)}$ is determined by the relationship:

$$u^*(x^{(k)}) = \underset{1 \le i \le M}{\mathrm{Argmin}} \|x^{(k)} - w^{(i)}\|^2$$

where the function ArgMin( ) determines the reference vector of the neuron i for which the distance of the vector from the synaptic weights thereof, or prototype, $w^{(i)}$ is lowest with the input $x^{(k)}$.

During a step E23, a second best winning unit u** is selected, preferably the unit comprising a single neuron. In a specific embodiment, the vector $w^{(i)}$ of the synaptic weights of the neuron i is compared with the input data $x^{(k)}$ using a specific distance, such as a Euclidian distance, so that the second winning neuron for the input $x^{(k)}$ is determined by the relationship:

$$u^{**}(x^{(k)}) = \underset{1 \le i \le M, i \ne u^*}{\mathrm{Argmin}} \|x^{(k)} - w^{(i)}\|^2$$

where the function ArgMin( ) determines the reference vector of the neuron i for which the distance of the vector from the synaptic weights thereof, or prototype, $w^{(i)}$ is lowest with the input $x^{(k)}$.

Distances other than the Euclidian distance can be selected in accordance with the specific characteristics of the input data.

Figure 4:
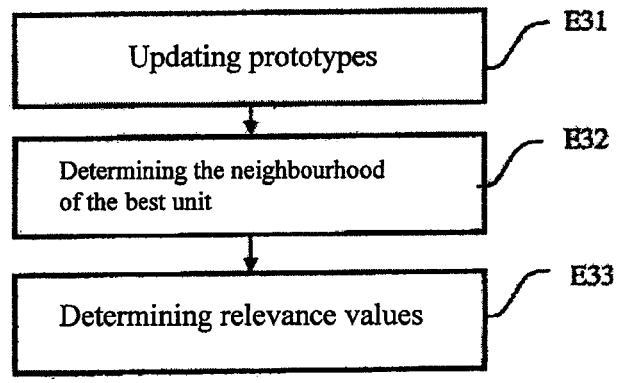

FIG. 4 illustrates a specific embodiment of the step for adapting the self-organising map. In step E31, a core function $K_{ij}$ is selected and is associated with a neighbourhood selection of a winning neuron, the core function $K_{ij}$ being determined as defined above. The prototype vectors or vectors of the synaptic weights of the neurons of the self-organising map are then updated based on a determined rule of the form:

$$w^{(i)}(t) = w^{(i)}(t-1) - \epsilon(t) \times K_{i,u^*}(x^{(k)}) \times (w^{(i)}(t-1) - x^{(k)})$$

where $w^{(i)}(t)$ and $w^{(i)}(t-1)$ are the prototype vectors of the prior state t−1 of the self-organising map and the updating state t;

$\epsilon(t)$ is a parameter for controlling the convergence of the learning algorithm at the time t.

At step E32, the topological neighbourhood N(u*) of the winning neuron u* is determined for the input $x^{(k)}$, that is to say, the topological neighbourhood N(u*) of the first best winning neuron determined during step E22 described above.

At step E33, the valuation values v of the topological connections of each neuron are determined, each value v being associated with a neighbourhood connection v and illustrated by a real relevance value of the pair constituted by a neighbourhood neuron which is connected to the winning neuron, as defined above. The determination of a connection relevance value of a neuron at the first best winning u* follows the following rule: if the connection is between the neurons u* and u**:

$$v_{u^*,u^{**}}(t) = v_{u^*,u^{**}}(t-1) + r(t) \times |\aleph(u^*)|$$

if the connection is between the neuron u* and any neuron of the neighbourhood N(u*), the second best winning u** being excluded:

$$v_{u^*,i}(t) = v_{u^*,i}(t-1) - r(t) \times |\aleph(u^*)| : \forall i \in \aleph(u^*), i \ne u^{**}$$

In this rule, the function r(t) is determined by a relationship of the form:

$$r(t) = \frac{1}{1 + e^{\left(-\frac{\alpha t}{t_{max}} + \beta\right)}}$$

the parameters α (alpha) and β (beta) being determined so as to carry out a regularisation of the adaptation of the topological connections.

The looping test of the method of the invention, or test E4 illustrated in FIG. 1, is negative as long as the repetition number is less than $t_{max}$.

After the learning phase described above, the typologies, categories or classes correspond to the neuron sub-groups of the self-organising map whose topological connections or relevance values are positive. The segmentation or cutting of the topological map is consequently automatically carried out during learning and without supervision.

In an embodiment of the invention, there is provided an additional step for refinement of the segmentation found. FIG. 6 is a flow chart of this additional step for refinement of the segmentation. During this additional step for segmentation refinement, a loop is carried out on T4 over all of the neurons of the self-organising map already processed by the learning step described above. The two following steps are carried out in a loop:

there are determined (E4) the local maxima of the local densities, that is to say, the reference of the associated neurons is referenced with a higher density than that of all their neighbours;

there is associated (E5) a label or class number or segment or category with each neuron representing a local density maximum.

The control then moves to the sequence of the control method, in particular a step for using the self-organising map whose output data are organised based on the refinement of the segmentation found. In particular this refinement step is advantageous when the local maxima of local densities correspond to determined map positions of individuals whose position and/or trajectory is followed by the execution of the control method of the invention.

In an embodiment of the invention, there is provision to carry out the determination of a new segmentation based on the additional step for refinement of the segmentation initially found. FIG. 7 is a flow chart of this step for determining an additional segmentation. During this step for determining an additional segmentation, a loop (T5) is carried out over all the neurons of the self-organising map after the preceding step for refinement of the segmentation found during which the following operations are carried out:

the aggregation of the other neurons of the map is carried out (E6) around the density peaks by following a density gradient which ascends along the topological connections connecting two neurons of the same class or segment or category; and no label or class number or segment or category is attributed to the non-connected neurons (E7).

In an embodiment of the invention there is provision for carrying out an additional step for correction of the noise by grouping sub-groups, such as classes, segments, or categories, illustrated in FIG. 8. In some groups, classes, segments or categories there are a given number of neurons or cells of the self-organising map which do not have sufficient distance expressed in terms of density between two categories which are initially different and it is therefore preferable to carry out a merging operation. To this end, during a loop T6, for each pair of local maxima (peak) of density which corresponds to two neighbouring neurons in the self-organising map, these density peaks are examined to see whether there are any neurons of minimal density. During a step E8, the density value of each neuron arranged geographically in the self-organising map between two maxima of density or peaks is tested in order to determine the minimum density value SDM. At the end of the loop T6, the control passes to a new loop T7 during which the merging of two sub-groups is carried out whose densities for two neighbouring neurons have too little difference. To this end, for each pair of neighbouring sub-groups, selected during the test T7, during a step E9, the detection of a pair of neighbouring neurons is carried out. Then, the test T8 is carried out in order to establish whether the two neurons belong to two different sub-groups, that is, the sub-groups SGA and SGB. If the two neighbouring neurons belong to different sub-groups SGA and SGB, the test is carried out in order to establish whether the two sub-groups belong to the same category CAT during a test T9. If the test T9 is positive, the merging of the two sub-groups SGA and SGB is carried out. If one or other of the tests T8 and/or T9 and after carrying out the step E10, the control passes to the loop end test T7. When the loop end test T7 is positive, the control passes to the operating step, the organisation of the self-organising map being separated from the noise constituted by the sub-groups which have insufficient distinction in the same category.

Generally, the step for refining the classification is based on the local densities. It consists in using means to determine and maintain this parameter $D^{(i)}$, updating the local density $D^{(i)}$, associated with each neuron i of the map in accordance with an adaptation rule, such as the following adaptation rule:

$$D^{(i)}(t) = D^{(i)}(t-1) + r(t) \times e^{-\frac{\|x^{(k)} - w^{(j)}(t)\|^2}{2\lambda^2(t)}}$$

the parameter $\lambda$ (lambda) being determined in order to carry out regularisation of the densities, the other parameters already having been defined above.

FIG. 12 illustrates the comparison of a classification carried out using a self-organising map and a control method according to the invention, with a classification carried out using an SOM of the prior art and on the same set of input data.

The self-organising map 101 shows in a display section two zones of active neurons, that is to say, a first zone of contiguous neurons 102 which correspond to a first class of data in the set of input data and a second zone of contiguous neurons 102 which correspond to a second class of data.

In contrast, the display of the active neurons on an SOM 104 of the prior art reveals a larger number of homogeneous zones, in this instance 6 zones, in comparison with the two zones detected in the invention. Furthermore, some data are attributed to classes which are rejected by the classification of the map of the invention 101.

In this manner, the invention allows an SOM or self-organising map to be used as a tool for reducing the size of the input data and ultimately allows a classification in the second operating level which has been described above. The classification provided by the invention is not limited to convex groups, but in contrast to the recognition of groups of random forms. Finally, the invention has the advantage of determining automatically during the learning step the number of homogeneous groups, or classes, without having to form hypotheses a priori relating to the classification criteria.

In another embodiment of the invention, the classification is automatically adapted in accordance with the various operations above. To this end, the self-organising map of the invention further co-operates with an incremental and evolutive learning resource as described below.

The control method of the invention comprises a learning step which is incremental and evolutive. To this end, there is carried out a non-supervised incremental classification which consists in seeking an evolutive representation model which globally summarises all of the data and their development. This classification comprises a step for incorporating the development during the process of modelling and thus providing it with properties of plasticity and stability. When the learning examples (sets of learning data) are provided on-line, that is to say, during operation, and the concepts of classes, that is to say, the result of the automatic classification, vary over time, the statistical formalism developed for the learning in the control method described above is no longer valid. The present invention also relates to a control method which also comprises an evolutive non-supervised learning step. Such an evolutive non-supervised learning step allows all knowledge development to be incorporated in the model without forgetting the knowledge already acquired.

The data collected, or input data, are organised in a manner known per se in a time sequence of databases designated:

$$\{BD_0, BD_1, BD_2, \ldots, BD_{t-1}, BD_t, \ldots\}.$$

An initial modelling of the database $BD_0$ is carried out by a learning system $SOM_o$ with the parameters $(W_0, V_0, D_0)$, grouping the prototypes $W_0$, the valuations of the topological connections $V_0$ and the data densities $D_0$, each triplet ( ) being associated with a self-organising map of the invention.

When the database $BD_1$ arrives, learning of another model SOMI is carried out by initialising the parameters thereof by $(W_0, V_0, D_0)$, and a learning database $BD_1+W_0$ composed of the combination of the new examples and prototypes $W_o$ of the map $SOM_0$.

When the database $BD_2$ arrives, the procedure is the same as above: initialisation by $(W_1, V_1, D_1)$ and learning on $BD_2+W_0+W_1$.

At time t with the database $BD_t$, another map $SOM_t$ is trained with an initialisation $(W_{t-1}, V_{t-1}, D_{t-1})$ and a learning database $BD_t+W_0+W_1+\ldots+W_{t-1}$.

In this manner, the control method of the invention generally comprises an evolutive and incremental learning step which is repeated at predetermined times and which comprises the following steps:

receiving a new database $BD_t$, learning a new self-organising map $SOM_t$ with an initialisation carried out by combining the definition triplet of the preceding map $SOM_{t-1}$, that is, $(W_{t-1}, V_{t-1}, D_{t-1})$ and a learning database comprising the combination of the learning database and t groups of prototype vectors acquired previously from the first operation of the self-organising map of the invention, that is, $$\{BD_t+W_0+W_1+\ldots+W_{t-1}\}.$$

FIG. 11 describes an application of the self-organising map and the control method described above. A plurality of mobile individuals in a real geographical space each carry individual markers ID-ét 122 and ID-ét 124. There may be a very large number of them, for example, several tens of thousands of markers. In an embodiment of the invention, each marker is constituted by a radio-frequency label RFID which contains at least one item of personal identification data associated with the mobile carrier of the label. Such a mobile carrier may be a trolley for purchasing goods in a supermarket or shopping centre, or a radio-frequency label associated with a person. The real space 126 can be constituted by any geographical zone or any other location organised in accordance with at least one geometric dimension, preferably two or three geometric dimensions. Such a real space may be constituted by the inner space of a shop or shopping centre or any region.

In the real space 126 there are arranged at determined geographical locations at least one detector of such markers, such as a reader for radio-frequency labels RFID 120 whose detection memory is capable of containing location data and time stamping data of the markers, such as the markers 122, 124 which enter into its detection field. At least at predetermined dates, the detection data entered as the detections are conveyed towards the storage section of a server for monitoring and analysis of the positions and the movements of the mobiles 122, 124 in real space. The monitoring and analysis server 130-140 comprises:

a storage section which maintains the detection data of the various detectors for the markers such as the detector 120;

a pre-processing section 132 which allows the data of the various readers stored in the storage section 130 to be collected together;

a data integration section 134 which in particular allows regularisation of the dates for downloading the various readers so that the group of data discharged towards the monitoring and analysis server can be compared and classified in accordance with determined classification criteria;

a pre-processing section 136 which allows erroneous data which are still contained in the data from the integration section 134 to be rejected;

a classification section 138 which comprise at least one self-organising map in accordance with what has been described above and which operates in accordance with a control method in accordance with what has been described above, the classification section also comprising a resource for determining classification criteria, a learning section for applying learning input data for the self-organising map; and a display section 140 for the classification of the data operated by the self-organising map of the classification section 138.

The classification section 138 and the display section 140 are provided so that the user of the monitoring and analysis server 130-140 can:

display the position data instantaneously or at determined times from the position of at least one mobile 122, 124 or a group of such carriers, and/or display the trajectory data over at least one determined period of at least one mobile 122, 124 or a group of such carriers.

FIG. 12 illustrates another application of the self-organising map and the control method described above. In such an application, a plurality of WEB clients or of any appropriate remote data-processing network can consult, by submitting a request, at least one localised resource on the network via a url address according to a tree structure which describes the geography of the possible access routes for all the clients to all the WEB servers. The application of the invention allows monitoring and analysis of the behaviours of the users or clients of the servers of the WEB network which constitutes a real space comparable with that described in relation to FIG. 11.

To this end, at least the websites in relation with the server for monitoring and analysis of navigation data 148-156, such as the website 144, comprise a resource which allows a marker or tracer 147 to be deposited, for example, in the form of a Javascript™ on the machine of a client 142 whose navigator has produced a request 145 such as an http request to access a resource indicated by a url locator 146. The tracer or marker 146 can be initially loaded on the Web site 144 during an initialisation procedure which is not directly involved with the present invention and which is well known to the person skilled in the art. This operation is illustrated by the arrow which connects the marker server 148 and the url 146 then by the arrow which connects the url 146 to the execution zone of the marker 147 on the machine of the client when the client has carried out the request 145, such as an http request for access to the url resource 146.

The marker server 148 receives tracing data comprising identification data of the client 142 and the url 146 and time-stamping data. In response, at least at predetermined dates, the tracing data held by the marker server 148 are transmitted to an integration section 150 which is similar to the integration section 134 described above.

The tracing data after integration are then transmitted to a pre-processing section 152 which is similar to the pre-processing section 136 described above in relation to the application of FIG. 11.

The tracing data after pre-processing are then supplied to a classification section 154 which is similar to the classification section 138 described above in relation to the application of FIG. 11.

The data from the classification by the section 154 are then passed to an illustration section 156 which is similar to the display section 136 described above in relation to the application of FIG. 11.

The classification section 154 and the display section 156 are provided so that the user of the monitoring and analysis server 148-156 can:
- display the consultation data instantaneously or at determined times of the navigation of at least one WEB client 142 or a group of such WEB clients, and/or
- display the trajectory data over at least a determined period of at least one WEB client 142 or a group of such clients in at least one section of the tree structure of the WEB servers which constitute the real space classified according to the invention.

As described in the introduction of the present application and at steps E2 and E3, the invention relates to a method for updating a self-organising map comprising neurons and valued connections between the neurons, each of the neurons being associated with a respective vector, referred to as the prototype vector.

As described in steps E22 and E23, there is provision, during this updating method, for selecting the two neurons u* and u**, referred to as the best winning neuron and second best winning neuron, respectively, each having the first and second prototype vector, respectively, closest to a vector of a learning point x(k), in accordance with a determined distance rule.

As described in step E31, there is further provision, during this updating method, to modify the prototype vectors of the best winning neuron u* and the neurons located around the best winning neuron u* in the self-organising map, in the direction of the vector of the learning point x(k).

As described in step E32, there is further provision, during this updating method, to determine the neighbouring neurons N(u*) of the best winning neuron u* in the self-organising map.

As described in step E33, there is further provision, in this updating method, if the second best winning neuron u** belongs to the neighbouring neurons N(u*), to increase the valuation of the connection between the first and second best winning neurons and to reduce the valuation of each connection between the first best winning neuron and the direct neighbouring neurons N(u*) other than the second best winning neuron u**.

Furthermore, it should be noted that the updating method according to the invention leaves unchanged the number of neurons of the self-organising map and the number of connections between the neurons of the self-organising map.

As described in step E33, the increase of the valuation of the connections between the first and second best winning neurons is carried out by the formula:

$$v_{u^*,u^{**}}(t) = v_{u^*,u^{**}}(t-1) + r(t) \times |\aleph(u^*)|$$

where:

$v_{u^*,u^{**}}(t)$ and $v_{u^*,u^{**}}(t-1)$ are the valuation of the connection between the first and s best winning neurons, respectively, after and before updating;

r(t) is a function for regularisation of the adaptation of the connections; and $|\aleph(u^*)|$ is the number of neighbouring neurons of the first best winning neuron.

As described in FIG. 1 and in the corresponding description, the invention also relates to a learning method for a self-organising map comprising neurons and valued connections between the neurons, each of the neurons being associated with a respective prototype vector.

As described in step E13, there is provision, in this learning method, to initialise the self-organising map, by initialising the valuation of each connection at a predetermined value.

As described in steps E2 and E3, there is further provision, in this learning method, for each of a plurality of learning points x(k) to update the self-organising map in accordance with the updating method according to the invention.

As described in step E12, there is further provision, in this learning method, for the initialisation of the neuron network to further comprise the initialisation of the prototype vector of each neuron at a random vector which is included in a predetermined range.

As described in the introduction of the present application, there is further provision, in this learning method, for groups, typologies, categories or classes to be discovered automatically at the same time as the estimate of the prototypes.

As described in the introduction of the present application, there is further provision, in this learning method, to associate, with each neuron of the self-organising map, a density in which there is recorded the number of learning points which are associated with the neuron. As described in steps E4 and E5, there is further provision, in this learning method, to determine the local maxima of densities and to associate a label or class number, or segment or category with each neuron representing a local density maximum.

As described in the introduction of the application, there is further provision, in this learning method, for the learning vectors to be obtained from a sensor, such as an RFID label or navigation markers on a remote data-processing network.

As described in the introduction of the application, there is further provision for the learning method to be non-supervised.

As described in the description of the other embodiment of the invention, at the end of the present application, there is provision in the invention to carry out the learning of the self-organising map from a first group of learning points, in particular with a learning method according to the invention, then to add, in a second group of learning points, the prototype vectors obtained following the previous learning, in order to obtain a new increased group, then re-learning the self-organising map from the new increased group, in particular using a learning method according to the invention.

As provided in the description with reference to FIG. 11, there is provision in the invention to carry out the learning of the map using a learning method according to the invention, then to display the classification of the data operated by the self-organising map.

The invention claimed is:

1. A method for updating a self-organising map comprising neurons and valued connections between the neurons, each of the neurons being associated with a respective vector, referred to as the prototype vector, the method comprising:
   selecting the two neurons (u* and u**), referred to as the best winning neuron and second best winning neuron, respectively, each having the prototype vector, respectively, the first and second closest to a vector of a learning point (x(k)), in accordance with a determined distance rule,
   modifying the prototype vectors of the best winning neuron and the neurons located around the best winning neuron in the self-organising map, in the direction of the vector of the learning point (x(k)), determining the neighbouring neurons (N(u*)) of the best winning neuron (u*) in the self-organising map, if the second best winning neuron (u**) is part of the neighbouring neurons (N(u*)) increasing the valuation of the connection between the first and second best winning neurons, the method being characterised in that it comprises:

reducing the valuation of each connection between the first best winning neuron and the direct neighbouring neurons (N(u*)) other than the second best winning neuron (u**), and wherein the method steps are performed by a processor.

2. The updating method according to claim 1, further characterised in that it leaves unchanged the number of neurons of the self-organising map.

3. The updating method according to claim 1, further characterised in that it leaves unchanged the number of connections between the neurons of the self-organising map.

4. Updating method according to any one of claims 1 to 3, further characterised in that the increase of the valuation of the connection between the first and second best winning neurons is carried out by the formula:

$$v_{u^*,u^{**}}(t) = v_{u^*,u^{**}}(t-1) + r(t) \times |\aleph(u^*)|$$

where:

$v_{u^*,u^{**}}(t)$ and $v_{u^*,u^{**}}(t-1)$ are the valuation of the connection between the first and second best winning neurons, respectively, after and before updating;

r(t) is a function for regularisation of the adaptation of the connections; and $|\aleph(u^*)|$ is the number of neighbouring neurons of the first best winning neuron.

5. A learning method for a self-organising map comprising neurons and valued connections between the neurons, each of the neurons being associated with a respective prototype vector, the method further being characterised in that it comprises:

initialising the neuron network by initialising the valuation of each connection at a predetermined value, for each of a plurality of learning points (x(k)), updating the neuron network in accordance with the method of claim 1 and wherein the method steps are performed by a processor.

6. The learning method according to claim 5, further characterised in that the initialisation of the neuron network further comprises the initialisation of the prototype vector of each neuron at a random vector which is included in a predetermined range.

7. The learning method according to claim 5, further characterised in that it comprises the discovery of groups, typologies, categories or classes, automatically at the same time as the estimate of the prototypes.

8. The learning method according to claim 5, further characterised in that it comprises:

associating, with each neuron of the self-organising map, a density in which there is recorded the number of learning points which are associated with the neuron.

9. The learning method according to claim 8, further characterised in that it comprises:

determining the local maxima of densities, associating a label or class number, or segment or category with each neuron representing a local density maximum.

10. The learning method according to claim 5, further characterised in that it comprises:

obtaining the learning vectors from a sensor, such as an RFID label or navigation markers on a remote data-processing network.

11. The learning method according to claim 5, further characterised in that it is non-supervised.

12. A learning method of a self-organising map, characterised in that it comprises:

learning of the self-organising map from a first group of learning points, using a method according to claim 5, adding, in a second group of learning points, the prototype vectors obtained following the previous learning, in order to obtain a new increased group, and re-learning of the self-organising map from the new increased group, using a method according to claim 5, and wherein the method steps are performed by a processor.

13. The learning method according to claim 12 wherein the processor is resident in a server.

14. A learning method of a self-organising map, characterised in that it comprises:

learning of the map using a method according to claim 5, and displaying the classification of the data operated by the self-organising map, and wherein the method steps are performed by a processor.

15. The learning method according to claim 14 wherein the processor is resident in a server.

16. The learning method according to claim 5 wherein the processor is resident in a server.

17. The updating method according to claim 1 wherein the processor is resident in a server.

* * * * *